United States Patent
Yan

(10) Patent No.: US 11,366,925 B2
(45) Date of Patent: Jun. 21, 2022

(54) METHODS AND APPARATUSES FOR CHAINING SERVICE DATA

(71) Applicant: ALIPAY (HANGZHOU) INFORMATION TECHNOLOGY CO., LTD., Zhejiang (CN)

(72) Inventor: Erfeng Yan, Hangzhou (CN)

(73) Assignee: Alipay (Hangzhou) Information Technology Co., Ltd., Zhejiang (CN)

(*) Notice: Subject to any disclaimer, the term of this patent is extended or adjusted under 35 U.S.C. 154(b) by 0 days.

(21) Appl. No.: 17/362,904

(22) Filed: Jun. 29, 2021

(65) Prior Publication Data

US 2021/0326471 A1 Oct. 21, 2021

(30) Foreign Application Priority Data

Sep. 23, 2020 (CN) .......................... 202011011188.1

(51) Int. Cl.
G06F 21/62 (2013.01)
G06F 16/2458 (2019.01)

(52) U.S. Cl.
CPC ...... *G06F 21/6227* (2013.01); *G06F 16/2471* (2019.01)

(58) Field of Classification Search
CPC ...... G06Q 30/018; G06Q 10/10; G06F 16/93; G06F 16/90335; G06F 21/602
See application file for complete search history.

(56) References Cited

U.S. PATENT DOCUMENTS

| | | | |
|---|---|---|---|
| 11,063,770 B1* | 7/2021 | Peng | H04L 63/123 |
| 2018/0268506 A1* | 9/2018 | Wodetzki | G06K 9/628 |
| 2018/0365201 A1* | 12/2018 | Hunn | H04L 9/3239 |
| 2019/0013932 A1* | 1/2019 | Maino | G06N 20/00 |

(Continued)

FOREIGN PATENT DOCUMENTS

| | | |
|---|---|---|
| CN | 107451175 | 12/2017 |
| CN | 108197505 | 6/2018 |

(Continued)

OTHER PUBLICATIONS

Crosby et al., "BlockChain Technology: Beyond Bitcoin," Sutardja Center for Entrepreneurship & Technology Technical Report, Oct. 16, 2015, 35 pages.

(Continued)

*Primary Examiner* — Oleg Korsak
(74) *Attorney, Agent, or Firm* — Fish & Richardson P.C.

(57) ABSTRACT

One or more embodiments of the present specification provide methods and apparatuses for chaining service data. Service data to be chained that is generated for each service processing node for a target service is obtained, where the service data to be chained includes feature values corresponding to a plurality of service data fields. A smart contract deployed in a blockchain is invoked to generate, based on the feature values corresponding to the plurality of service data fields and at least one predetermined digest information field, service data digest information corresponding to each service processing node, where the at least one predetermined digest information field includes at least one specified data field in a unified digest data structure built for a plurality of service processing nodes. The service data digest information generated for each service processing node and the corresponding service data to be chained are stored in the blockchain.

18 Claims, 10 Drawing Sheets

(56) References Cited

U.S. PATENT DOCUMENTS

| | | | |
|---|---|---|---|
| 2019/0334725 A1 | 10/2019 | Zhuang et al. | |
| 2019/0340013 A1* | 11/2019 | Celia | G06F 9/5005 |
| 2019/0361917 A1* | 11/2019 | Tran | G06F 16/28 |
| 2020/0034453 A1* | 1/2020 | Sato | H04L 63/123 |
| 2020/0104296 A1* | 4/2020 | Hunn | G06F 16/2379 |
| 2020/0175206 A1* | 6/2020 | Brannon | G06F 21/604 |
| 2020/0234351 A1* | 7/2020 | Qing | G06F 16/26 |
| 2020/0349561 A1* | 11/2020 | Kuchkovsky Jimenez | G06F 16/2365 |
| 2020/0349663 A1* | 11/2020 | Quadras | G06Q 40/02 |
| 2020/0356697 A1* | 11/2020 | Brannon | G06Q 20/047 |
| 2021/0166326 A1* | 6/2021 | Wang | G06Q 20/02 |
| 2021/0192082 A1* | 6/2021 | Jones | G06F 21/60 |

FOREIGN PATENT DOCUMENTS

| | | | |
|---|---|---|---|
| CN | 108389129 | | 8/2018 |
| CN | 109101577 | | 12/2018 |
| CN | 110069932 | | 7/2019 |
| CN | 113032735 | * | 5/2021 |

OTHER PUBLICATIONS

Nakamoto, "Bitcoin: A Peer-to-Peer Electronic Cash System," www.bitcoin.org, 2005, 9 pages.

Extended European Search Report in European Application No. 21182709.2, dated Dec. 14, 2021, 12 pages.

Li et al., "Editorial updates for draft Recommendation ITU-T Y.SSC-BKDMS-arc 'Reference architecture of blockchain-based unified KPI data managementfor smart sustainable cities'—for consent; C710-R1," ITU-T Drah I, Study Period 2017-2020, Study Group 20, Series C710-Ri, International Telecommunication Union, vol. 7/20, Jun. 25, 2020, pp. 1-14.

* cited by examiner

//METHODS AND APPARATUSES FOR CHAINING SERVICE DATA

CROSS-REFERENCE TO RELATED APPLICATIONS

This application claims priority to Chinese Patent Application No. 202011011188.1, filed on Sep. 23, 2020, which is hereby incorporated by reference in its entirety.

TECHNICAL FIELD

The present specification relates to the field of Internet technologies, and in particular, to methods and apparatuses for chaining service data.

BACKGROUND

Currently, more applications use blockchain technologies to implement data storage, due to features such as immutability and decentralization of blockchain technologies. Each piece of service data to be chained is stored in a blockchain in a predetermined ciphertext form. Service data stored in the blockchain includes a transaction hash, a transaction type, a block hash, a nonce string, etc. Therefore, service data that is read directly from the blockchain has a problem of poor readability.

SUMMARY

One or more embodiments of the present specification aim to provide methods for chaining service data. The methods for chaining service data include the following:

Service data to be chained that is generated for each service processing node for a target service is obtained, where the service data to be chained includes feature values corresponding to a plurality of service data fields. A smart contract deployed in a blockchain is invoked to generate, based on the feature values corresponding to the plurality of service data fields and at least one predetermined digest information field, service data digest information corresponding to the service processing node, where the at least one predetermined digest information field includes at least one specified data field in a unified digest data structure built for a plurality of service processing nodes. The service data digest information and the service data to be chained are stored in the blockchain.

One or more embodiments of the present specification aim to provide apparatuses for chaining service data. The apparatuses for chaining service data include the following: a service data acquisition module, configured to obtain service data to be chained that is generated for each service processing node for a target service, where the service data to be chained includes feature values corresponding to a plurality of service data fields; a digest information generation module, configured to invoke a smart contract deployed in a blockchain to generate, based on the feature values corresponding to the plurality of service data fields and at least one predetermined digest information field, service data digest information corresponding to the service processing node, where the at least one predetermined digest information field includes at least one specified data field in a unified digest data structure built for a plurality of service processing nodes; and a module for chaining service data, configured to store the service data digest information and the service data to be chained in the blockchain.

One or more embodiments of the present specification aim to provide devices for chaining service data, including a processor and a memory arranged to store a computer-executable instruction.

When being executed, the computer-executable instruction enables the processor to obtain service data to be chained that is generated for each service processing node for a target service, where the service data to be chained includes feature values corresponding to a plurality of service data fields; invoke a smart contract deployed in a blockchain to generate, based on the feature values corresponding to the plurality of service data fields and at least one predetermined digest information field, service data digest information corresponding to the service processing node, where the at least one predetermined digest information field includes at least one specified data field in a unified digest data structure built for a plurality of service processing nodes; and store the service data digest information and the service data to be chained in the blockchain.

One or more embodiments of the present specification aim to provide storage media, configured to store a computer-executable instruction. When being executed, the executable instruction enables a processor to obtain service data to be chained that is generated for each service processing node for a target service, where the service data to be chained includes feature values corresponding to a plurality of service data fields; invoke a smart contract deployed in a blockchain to generate, based on the feature values corresponding to the plurality of service data fields and at least one predetermined digest information field, service data digest information corresponding to the service processing node, where the at least one predetermined digest information field includes at least one specified data field in a unified digest data structure built for a plurality of service processing nodes; and store the service data digest information and the service data to be chained in the blockchain.

BRIEF DESCRIPTION OF DRAWINGS

To describe technical solutions in one or more embodiments of the present specification or in the existing technology more clearly, the following briefly describes the accompanying drawings needed for describing the embodiments or the existing technology. Clearly, the accompanying drawings in the following descriptions merely show some embodiments of the present application, and a person of ordinary skill in the art can still derive other drawings from these accompanying drawings without creative efforts.

DESCRIPTION OF EMBODIMENTS

To make a person skilled in the art better understand the technical solutions in one or more embodiments of the present specification, the following describes in detail the technical solutions in the one or more embodiments of the present specification in combination with the accompanying drawings in the one or more embodiments of the present specification. Clearly, the described embodiments are merely some but not all of the embodiments of the present specification. All other embodiments obtained by a person of ordinary skill in the art based on the one or more embodiments of the present specification without creative efforts shall fall within the protection scope of the present specification.

It is worthwhile to note that one or more embodiments of the present specification and features in the embodiments can be combined without conflict. The following describes in detail one or more embodiments of the present specification with reference to the accompanying drawings in combination with the embodiments.

One or more embodiments of the present specification provide methods and apparatuses for chaining service data. By using a smart contract deployed in a blockchain in advance, corresponding service data digest information is generated for service data to be chained that is generated for each service processing node in a process of executing a target service. The service data digest information is generated based on a unified digest data structure included in the smart contract. Then, the service data digest information corresponding to each service processing node is separately stored in the blockchain. As such, readability of service data stored in the blockchain can be implemented to facilitate a service data tracing service of any service processing node for the target service subsequently provided for a user, so that the user can quickly and clearly obtain a brief description of a processing procedure of any service processing node by using a client device.

Figure 1:
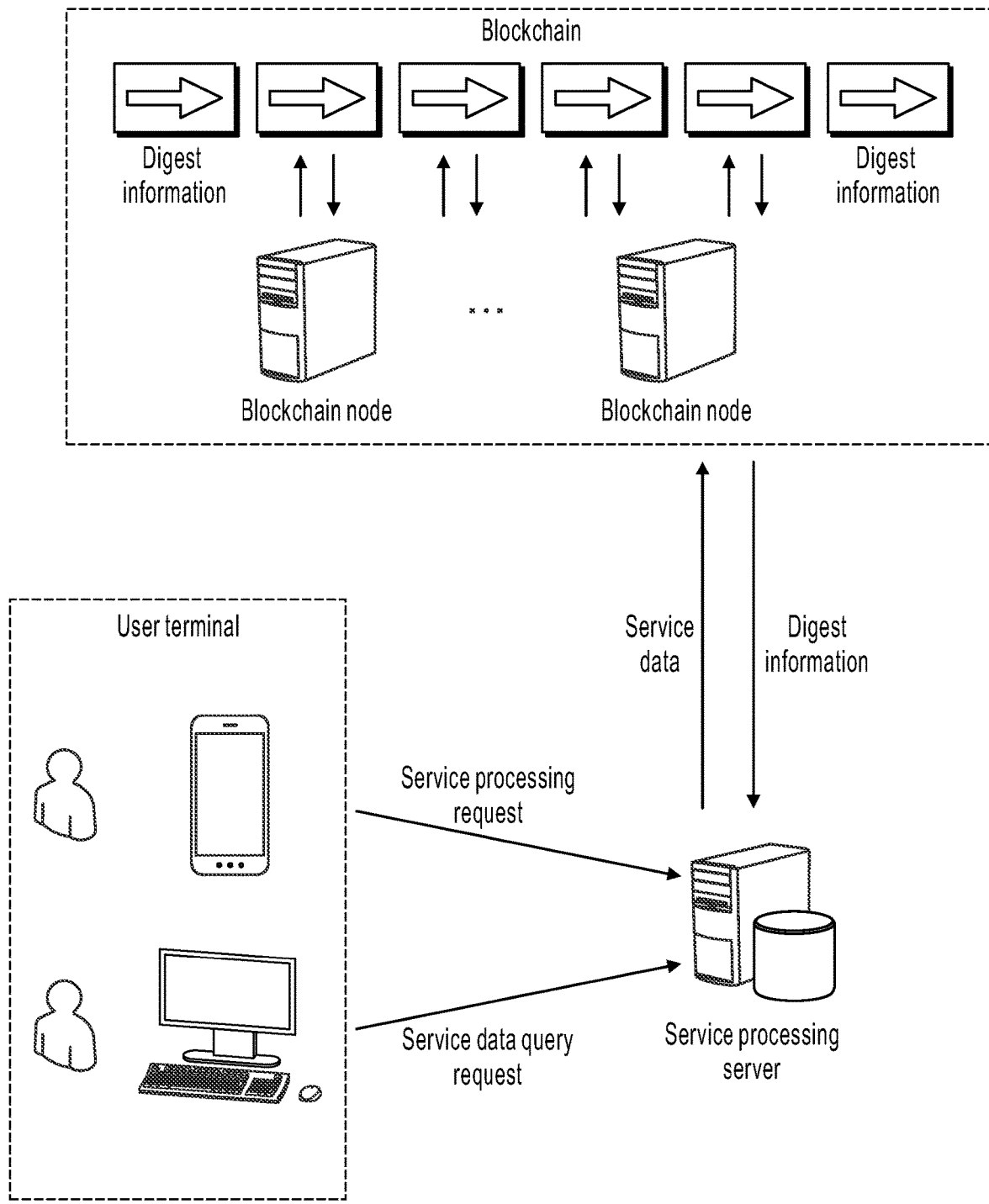
FIG. 1 is a schematic diagram illustrating an application scenario of a system for chaining service data, according to one or more embodiments of the present specification.

FIG. 1 is a schematic diagram illustrating an application scenario of a system for chaining service data, according to one or more embodiments of the present specification. As shown in FIG. 1, the system includes a user terminal, a service processing server, and at least one blockchain node in a blockchain. The user terminal can be a mobile terminal such as a smartphone or a tablet computer, and the user terminal can alternatively be a terminal device such as a personal computer. The service processing server can be a service server for processing a service request from the user terminal, where the service request can be a service processing request. The service request can alternatively be a service data query request, and correspondingly, the user terminal is a service data query terminal. The service processing server can be an independent server or a server cluster including a plurality of servers.

The service processing server can access the blockchain and serve as a blockchain node in the blockchain. The service processing server can alternatively communicate with at least one blockchain node that accesses the blockchain. That the service processing server accesses the blockchain is used as an example. Specifically, a specific process of service data chaining is as follows:

Based on a first trigger operation of a user, the user terminal sends a service processing request of a target service to the service processing server, where the service processing request includes identification information of the target service.

In response to the service processing request, the service processing server generates corresponding service data for each service processing node for the target service, and sends the service data to at least one blockchain node in the blockchain.

The at least one blockchain node obtains service data to be chained that is generated for each service processing node for the target service, where the service data to be chained includes feature values corresponding to a plurality of service data fields.

The at least one blockchain node invokes a smart contract deployed in the blockchain to generate, based on the feature values corresponding to the plurality of service data fields in the service data to be chained and at least one predetermined digest information field, service data digest information corresponding to each service processing node, where the at least one predetermined digest information field includes at least one specified data field in a unified digest data structure built for a plurality of service processing nodes.

The at least one blockchain node stores the service data digest information and the service data to be chained that are corresponding to each service processing node in the blockchain.

Based on a second trigger operation of the user, the user terminal sends a service data query request of the target service to the service processing server, where the service data query request includes a service processing order identifier of the target service.

The service processing server sends the service data query request to at least one blockchain node in the blockchain.

After receiving the service data query request, the at least one blockchain node obtains service data digest information and chained service data of a plurality of service processing nodes corresponding to the service processing order identifier from the blockchain.

The at least one blockchain node sends the service data digest information and the chained service data to the service processing server.

The service processing server generates target page data based on the service data digest information and the chained service data, and sends the target page data to a corresponding service data query terminal.

The service data query terminal performs page rendering based on the received target page data, to display the service data digest information based on the unified digest data structure and display corresponding service data based on an original blockchain storage data structure.

In a process of processing the target service based on the blockchain and storing generated service data in the blockchain in the previous application scenario, by using the smart contract deployed in the blockchain in advance, corresponding service data digest information is generated for the service data to be chained that is generated for each service processing node in a process of executing the target service. The service data digest information is generated based on the unified digest data structure included in the smart contract. Then, the service data digest information corresponding to each service processing node is separately stored in the blockchain. As such, readability of service data stored in the blockchain can be implemented to facilitate a service data tracing service of any service processing node for the target service subsequently provided for the user, so that the user can quickly and clearly obtain a brief description of a processing procedure of any service processing node by using a client device.

Figure 2:
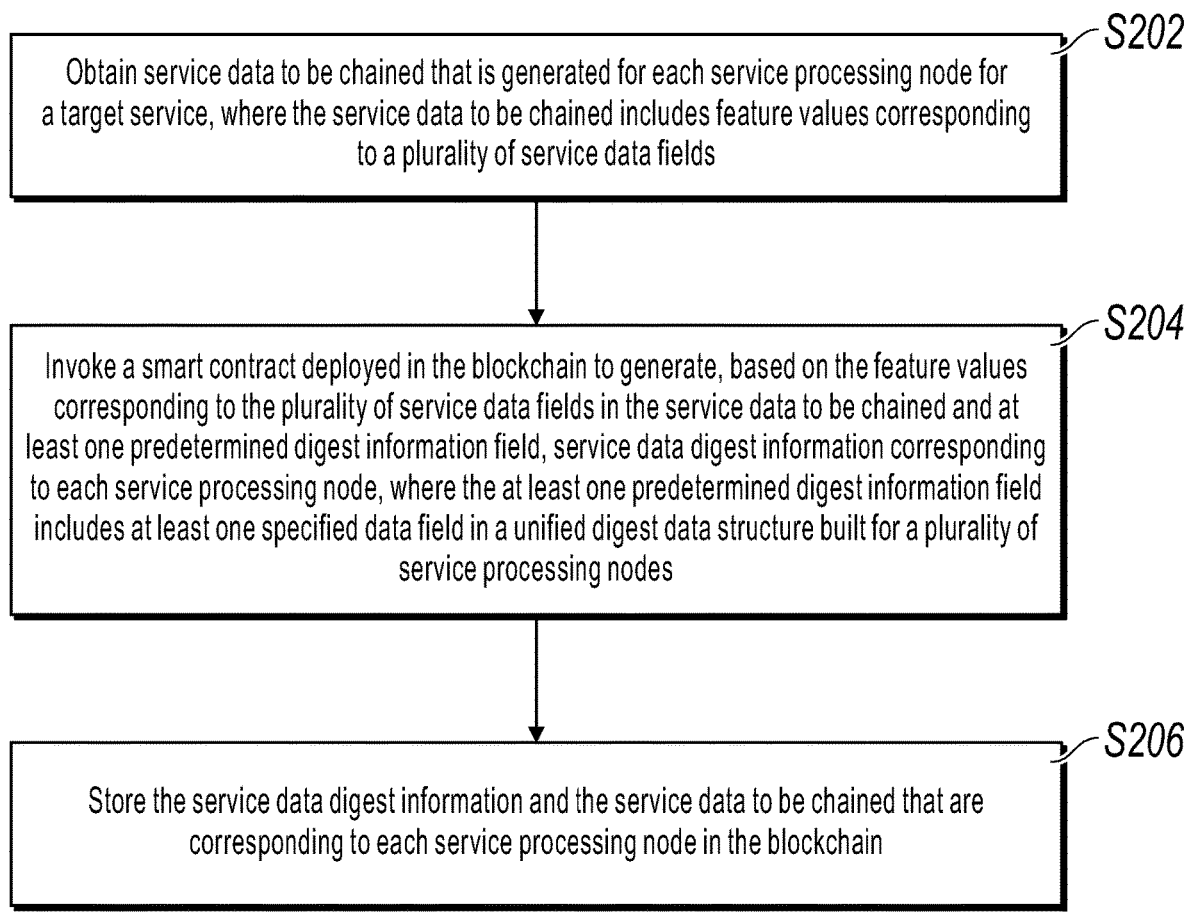
FIG. 2 is a first schematic flowchart illustrating a method for chaining service data, according to one or more embodiments of the present specification.

FIG. 2 is a first schematic flowchart illustrating a method for chaining service data, according to one or more embodiments of the present specification. The method in FIG. 2 can be performed by at least one blockchain node in the blockchain in FIG. 1. As shown in FIG. 2, the method includes at least the following steps:

S202: Obtain service data to be chained that is generated for each service processing node for a target service, where the service data to be chained includes feature values corresponding to a plurality of service data fields.

For a certain target service that is processed based on a blockchain, a service processing procedure of the target service generally includes a plurality of service processing phases. To ensure data security and traceability, chaining processing needs to be performed on service data generated in some or all of the service processing phases in the service processing procedure. If each service processing phase corresponds to at least one service processing node, service data generated in corresponding service processing for each service processing phase is service data to be chained that is generated for at least one service processing node corresponding to the service processing phase.

That the target service is a digital property service business is used as an example. The digital property service business is a business service mainly for converting physical goods into digital assets. A plurality of service processing phases included in a service processing procedure of the digital property service business can include warehouse receipt registration, warehouse stock transfer, warehouse receipt pledge, release of warehouse receipt pledge, cancellation of warehouse receipt, etc. Correspondingly, service data generated for each service processing node in the digital property service business is obtained as service data to be chained. For example, after a warehouse receipt is registered, service data generated for a warehouse receipt registration phase is obtained as service data 1 to be chained. For another example, after warehouse stock transfer is completed, service data generated for a warehouse stock transfer phase is obtained as service data 2 to be chained. Similarly, for any service processing node in each currently completed service processing phase, service data generated for the service processing node is obtained as service data to be chained.

S204: Invoke a smart contract deployed in the blockchain to generate, based on the feature values corresponding to the plurality of service data fields in the service data to be chained and at least one predetermined digest information field, service data digest information corresponding to each service processing node, where the at least one predetermined digest information field includes at least one specified data field in a unified digest data structure built for a plurality of service processing nodes.

A smart contract including a unified digest data structure can be generated in advance. The smart contract is used to automatically generate corresponding service data digest information for each piece of service data to be chained. In addition, the smart contract is deployed in the blockchain so that when data chaining processing is performed on service data generated for each service processing node, the smart contract is invoked to automatically generate corresponding service data digest information for the service processing node.

S206: Store the service data digest information and the service data to be chained that are corresponding to each service processing node in the blockchain.

Specifically, after corresponding service data digest information is generated for service data generated for a service processing node that currently completes execution, chaining processing is performed on the service data digest information and the corresponding service data in real time. The service data is still to be stored in the blockchain by using an original blockchain storage data structure in a ciphertext form, but the service data digest information is now to be stored in the blockchain by using the newly added unified digest data structure in a plaintext form. As such, readability of service data stored in the blockchain is implemented on the premise of ensuring security of service data.

In the one or more embodiments of the present specification, by using the smart contract deployed in the blockchain in advance, corresponding service data digest information is generated for the service data to be chained that is generated for each service processing node in a process of executing the target service. The service data digest information is generated based on the unified digest data structure included in the smart contract. Then, the service data digest information corresponding to each service processing node is separately stored in the blockchain. As such, readability of service data stored in the blockchain can be implemented to facilitate a service data tracing service of any service processing node for the target service subsequently provided for a user, so that the user can quickly and clearly obtain a brief description of a processing procedure of any service processing node by using a client device.

Figure 3:
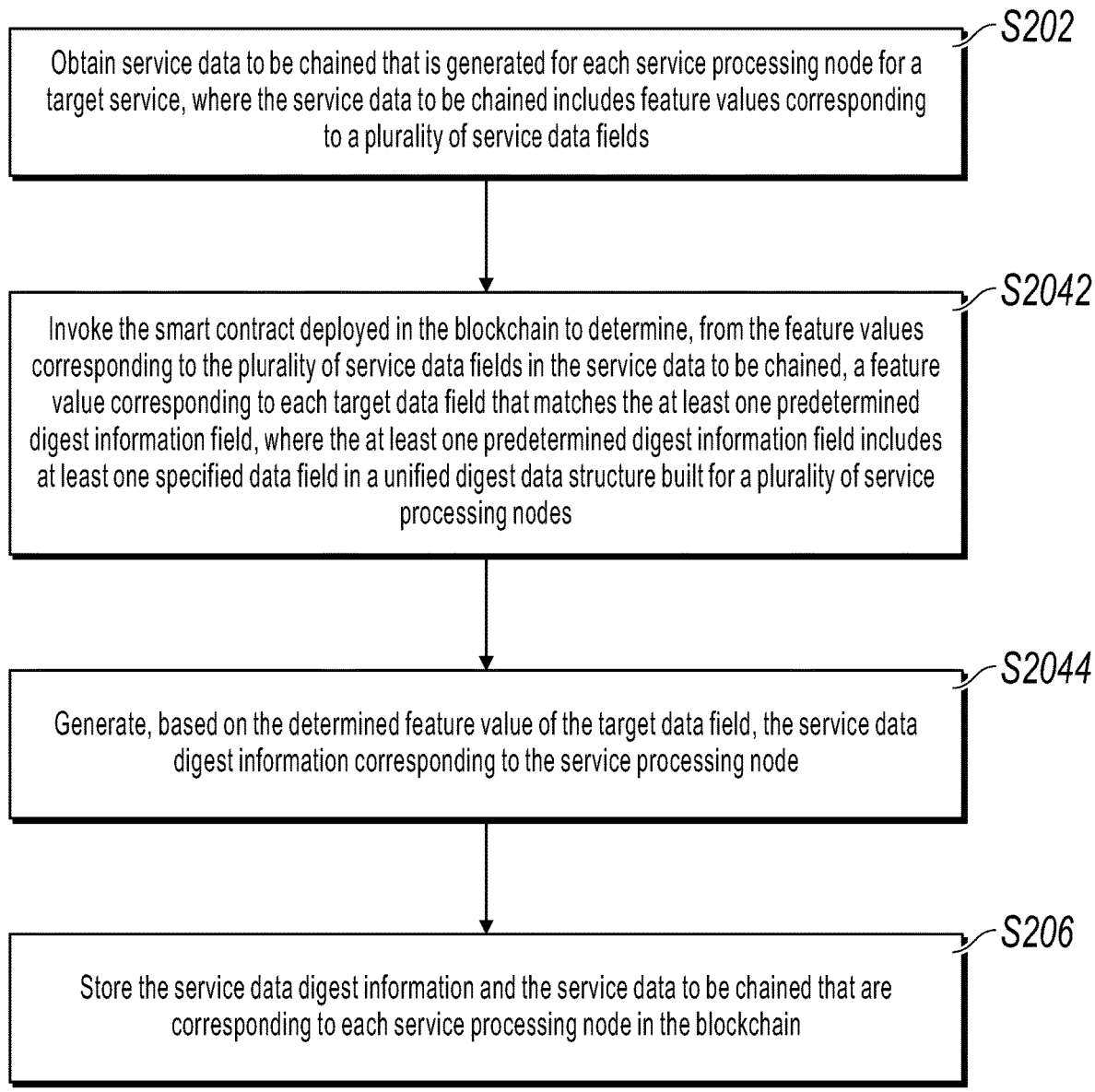
FIG. 3 is a second schematic flowchart illustrating a method for chaining service data, according to one or more embodiments of the present specification.

As shown in FIG. 3, above-mentioned S204 of invoking a smart contract deployed in the blockchain to generate, based on the feature values corresponding to the plurality of service data fields in the service data to be chained and at least one predetermined digest information field, service data digest information corresponding to each service processing node specifically includes the following:

S2042: Invoke the smart contract deployed in the blockchain to determine, from the feature values corresponding to the plurality of service data fields in the service data to be chained, a feature value corresponding to each target data field that matches the at least one predetermined digest information field, where the at least one predetermined digest information field includes at least one specified data field in a unified digest data structure built for a plurality of service processing nodes.

Specifically, the at least one specified data field can include at least one of a service processing identifier, a service operation content description, and additional service operation information. The service operation content description includes a service executor, a service processing action type, and a service operation object.

Correspondingly, after the service data to be chained is obtained, the smart contract deployed in the blockchain is invoked to determine, from the feature values corresponding to the plurality of service data fields in the service data to be chained, a feature value corresponding to each target data field that matches the at least one specified data field in the unified digest data structure.

During specific implementation, the smart contract deployed in the blockchain is invoked to separately determine the service processing identifier, the service executor, the service processing action type, the service operation object, and the additional service operation information based on the service data to be chained.

For example, that the target service is a digital property service business is still used as an example. For a service processing phase of warehouse receipt registration, the service processing identifier can be warehouse receipt registration, the service executor can be a XX system, the service processing action type can be generation, the service operation object can be a blockchain warehouse receipt, and the additional service operation information can be a warehouse receipt ID that is ff148b4502202007081114243245.

S2044: Generate, based on the determined feature value of the target data field, the service data digest information corresponding to the service processing node.

Specifically, after the feature value corresponding to each target data field that matches the at least one specified data field in the unified digest data structure is determined, corresponding service data digest information is generated based on the feature value. Specifically, above-mentioned S2044 of generating, based on the determined feature value of the target data field, the service data digest information corresponding to the service processing node specifically includes the following:

Step 1: Assign a value to each specified data field in the unified digest data structure included in the smart contract based on the determined feature value of the target data field, to obtain a post-assignment unified digest data structure.

Step 2: Determine the post-assignment unified digest data structure as the service data digest information corresponding to the service processing node.

Specifically, the service processing phase of warehouse receipt registration in the digital property service business is used as an example. Assume that determined feature values of target data fields are respectively as follows: A feature value corresponding to the service processing identifier is warehouse receipt registration, a feature value corresponding to the service executor is a XX system, a feature value corresponding to the service processing action type is generation, a feature value corresponding to the service operation object is a blockchain warehouse receipt, and a feature value corresponding to the additional service operation information is a warehouse receipt ID that is ff148b4502202007081114243245. In this case, a service processing identifier field in the unified digest data structure is assigned to warehouse receipt registration, a service executor field in the unified digest data structure is assigned to the XX system, a service processing action type field in the unified digest data structure is assigned to generation, a service operation object field in the unified digest data structure is assigned to the blockchain warehouse receipt, and an additional service operation information field in the unified digest data structure is assigned to the warehouse receipt ID that is ff148b4502202007081114243245.

Specifically, for each service processing node, service processing identifier information, service executor information, service processing action type information, service operation object information, and additional service operation information are extracted from service data corresponding to the service processing node. A service operation content description is generated based on the service executor information, the service processing action type information, and the service operation object information.

Figure 4:
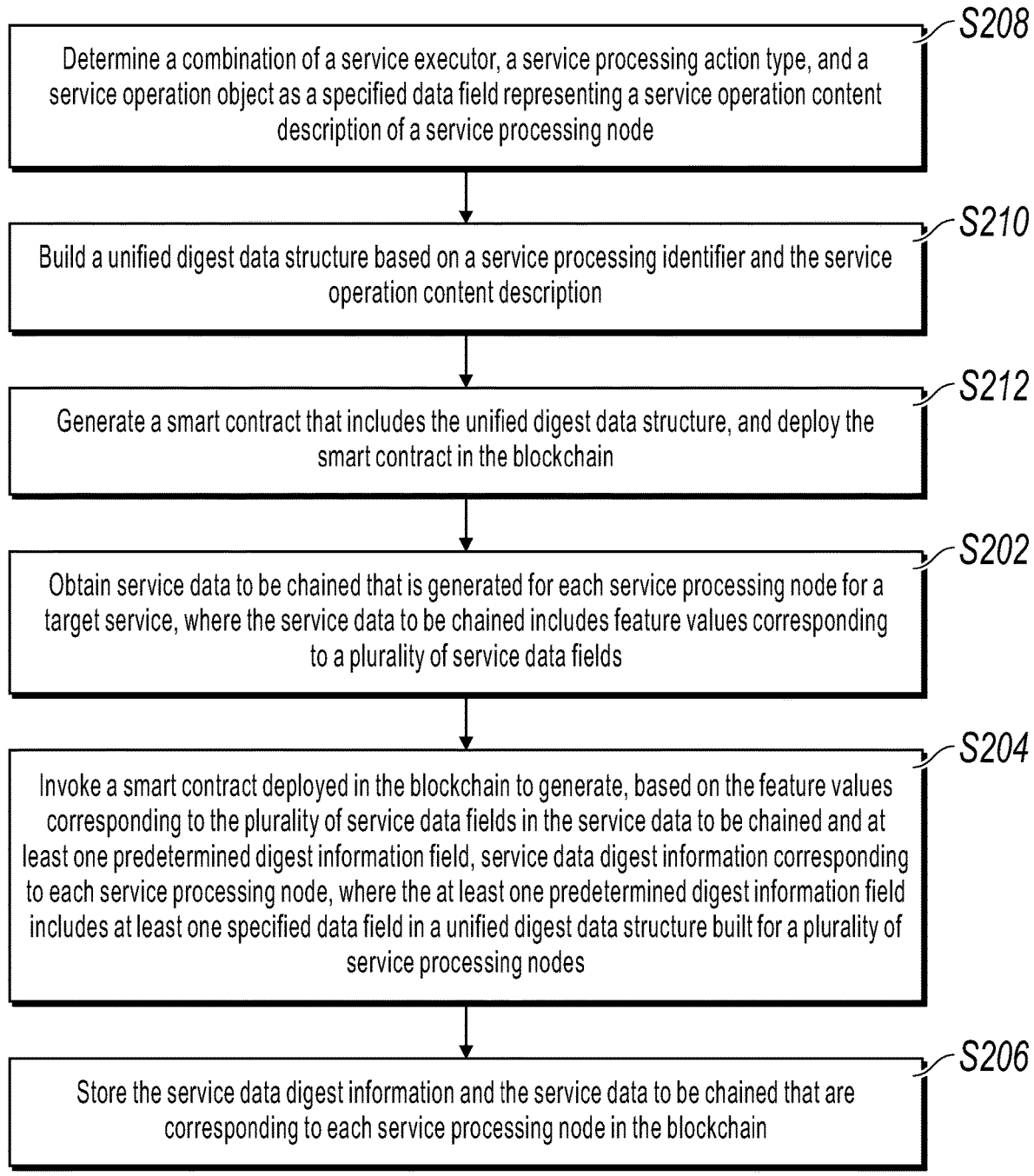
FIG. 4 is a third schematic flowchart illustrating a method for chaining service data, according to one or more embodiments of the present specification.

A smart contract used to generate service data digest information corresponding to each service processing node needs to be deployed in the blockchain in advance. As such, a corresponding smart contract can be automatically invoked subsequently to trigger automatic generation of service data digest information and service data chaining for storage, to ensure normalization and standardization of service data digest information generated for different service processing nodes. Further, when a new service processing node needs to be added for the target service, the smart contract deployed in advance can also be invoked to generate corresponding service data digest information that includes a unified digest data structure obtained after field assignment, thereby improving universality and adaptability of a generation process of service data digest information, to adapt to a change operation performed on a service processing node for the target service. Based on this, as shown in FIG. 4, before above-mentioned S202 of obtaining service data to be chained that is generated for each service processing node for a target service, the following is further included:

S208: Determine a combination of a service executor, a service processing action type, and a service operation object as a specified data field representing a service operation content description of the service processing node.

The service executor can be an executor of the service processing node, the service processing action type can be an operation action performed on a current service processing node, and the service operation object can be an object operated for the current service processing node. Correspondingly, in a process of generating service data digest information for the service processing node, values are assigned to the service executor, the service processing action type, and the service operation object based on the feature values that are corresponding to the plurality of service data fields and that are included in the service data.

For example, that the target service is a digital property service business is still used as an example. In a process of generating service data digest information for the service processing node, feature values corresponding to the service executor include a depositor, a warehouseman, a lender, a XX system, etc.; feature values corresponding to the service processing action type include submission, agreement/rejection, upload, update, confirmation, generation, etc.; and feature values corresponding to the service operation object include a warehousing application, a warehousing video, warehouse receipt information, a pledge application, an application for release of pledge, an application for cancellation, a blockchain warehouse receipt, etc.

S210: Build a unified digest data structure based on a service processing identifier and the service operation content description.

The at least one specified data field in the unified digest data structure further includes the service processing identifier. Specifically, the unified digest data structure is built based on a first specified data field representing the service processing identifier and at least one second specified data field representing the service operation content description.

The service processing identifier can be a name of a service processing phase or a unique identification code of a service processing phase. To further improve readability of chained data, the name of a service processing phase is preferably used as the first specified data field representing the service processing identifier in the unified digest data structure. For example, for the digital property service business, in the process of generating service data digest information for the service processing node, feature values corresponding to the service processing identifier include warehouse receipt registration, warehouse stock transfer, warehouse receipt pledge, release of warehouse receipt pledge, cancellation of warehouse receipt, etc.

S212: Generate a smart contract that includes the unified digest data structure, and deploy the smart contract in the blockchain.

Figure 5:
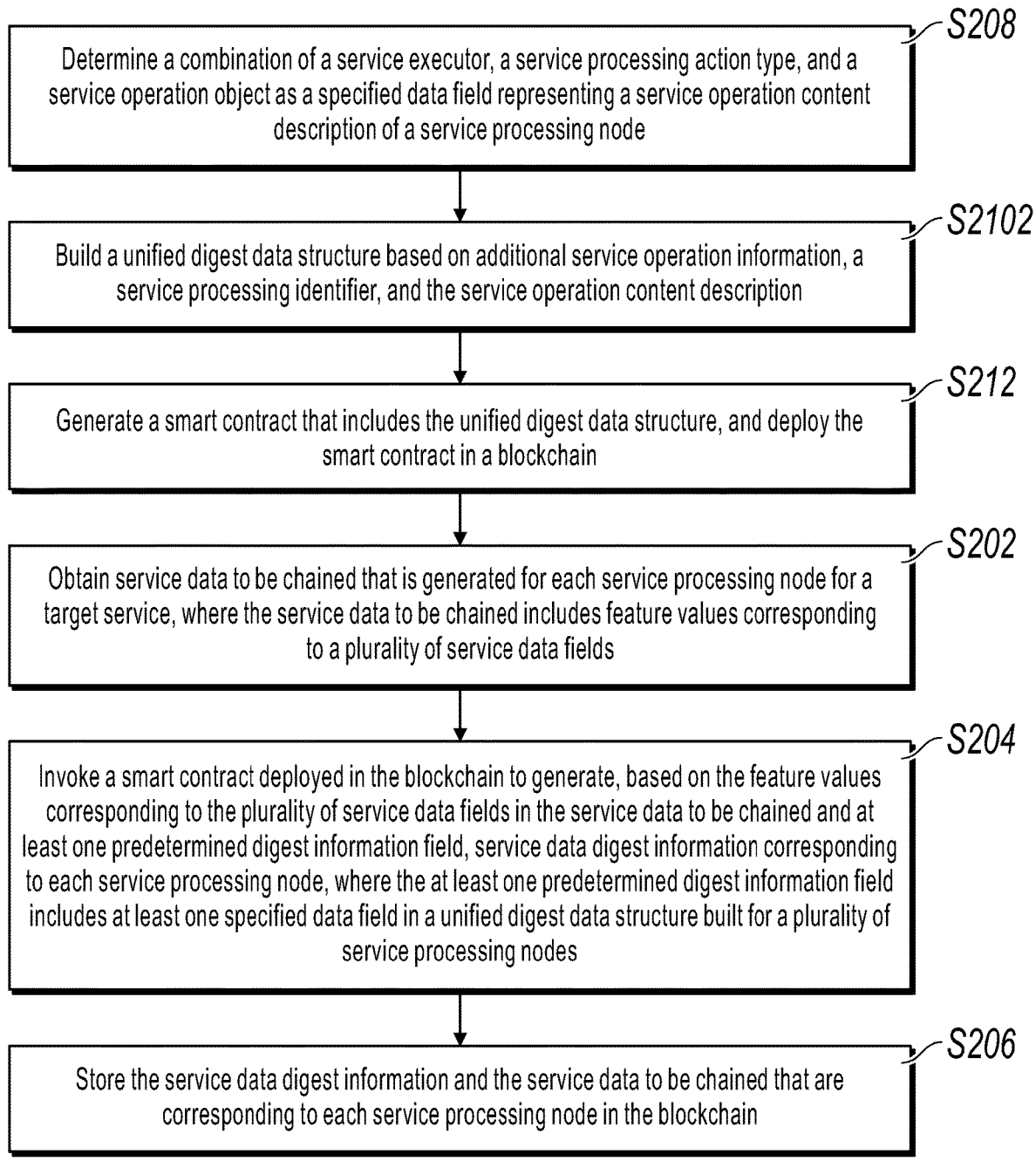
FIG. 5 is a fourth schematic flowchart illustrating a method for chaining service data, according to one or more embodiments of the present specification.

Further, to satisfy a need of a user to understand more key information based on the service data digest information, additional service operation information that can be made public can be added to the service data digest information. Based on this, as shown in FIG. 5, above-mentioned S210 of building a unified digest data structure based on a service processing identifier and the service operation content description specifically includes the following:

S2102: Build the unified digest data structure based on additional service operation information, the service processing identifier, and the service operation content description.

Specifically, the unified digest data structure is built based on at least one third specified data field representing the additional service operation information, the first specified data field representing the service processing identifier, and the at least one second specified data field representing the service operation content description. The at least one second specified data field is determined based on a field representing the service executor, a field representing the service processing action type, and a field representing the service operation object.

The additional service operation information can be key information that is generated for the current service processing node in a process of performing service processing and that can be made public among blockchain nodes. The additional service operation information is used to provide an additional description for the process of service processing performed by the current service processing node.

For example, that the target service is a digital property service business is still used as an example. The at least one third specified data field representing the additional service operation information includes a warehouse receipt ID field, a physical goods category field, a physical goods quantity field, a physical goods type field, etc.

Further, considering that service attributes of different service processing nodes are different, additional service operation information that needs to be added for different service processing nodes may be different. Based on this, above-mentioned S212 of generating a smart contract that includes the unified digest data structure, and deploying the smart contract in the blockchain specifically includes the following:

Step 1: Determine a mapping relationship between a service processing node that the target service relates to and at least one additional information field that needs to be included in additional service operation information that is added for the service processing node.

Step 2: Generate a smart contract that includes the unified digest data structure and the mapping relationship, and deploy the smart contract in the blockchain.

Correspondingly, for a process of determining a feature value corresponding to a target data field, above-mentioned S2042 of invoking the smart contract deployed in the blockchain to determine, from the feature values corresponding to the plurality of service data fields in the service data to be chained, a feature value corresponding to each target data field that matches the at least one predetermined digest information field specifically includes the following:

Step 1: Invoke the smart contract deployed in the blockchain to determine, based on the mapping relationship determined in advance, at least one additional information field that corresponds to the service processing node that generates the service data to be chained.

Step 2: Determine, from the feature values corresponding to the plurality of service data fields in the service data to be chained, a feature value corresponding to each target data field that matches the at least one additional information field corresponding to the service processing node.

Step 3: Determine, from the feature values corresponding to the plurality of service data fields in the service data to be chained, a feature value corresponding to each target data field that matches at least one other specified data field in the unified digest data structure.

For example, for a service processing node that a depositor submits a warehousing application in a warehouse receipt registration phase, at least one third specified data field that needs to be added and that represents the additional service operation information can include a physical goods category field, a physical goods quantity field, and a physical goods type field. For another example, for a service processing node that a depositor submits a pledge application in a warehouse receipt pledge phase, at least one third specified data field that needs to be added and that represents the additional service operation information can include a warehouse receipt ID field.

Further, in a service data query and tracing process, service data digest information with high readability is displayed for a user, so that the user can quickly and clearly obtain a brief description of a processing procedure of any service processing node on the premise of ensuring security of service data. Therefore, information included in the service data digest information can be made public. Based on this, to further improve generation efficiency of service data digest information, above-mentioned S2042 of invoking the smart contract deployed in the blockchain to determine, from the feature values corresponding to the plurality of service data fields in the service data to be chained, a feature value corresponding to each target data field that matches the at least one predetermined digest information field specifically includes the following:

The smart contract deployed in the blockchain is invoked to determine public service data fields and private service data fields based on field annotation information that is used to represent data privacy attributes and that is corresponding to the service data fields in the service data to be chained.

The feature value corresponding to each target data field that matches the at least one predetermined digest information field is determined from feature values corresponding to the determined public service data fields.

Specifically, when performing service processing and generating corresponding service data for each service processing node for the target service, a service processing server can mark fields based on privacy attributes of a plurality of service data fields in the service data. As such, in a process of generating corresponding service data digest information for each service processing node, a blockchain node first obtains, through screening, feature values of public service data fields based on privacy attribute annotation information of the service data fields, and then identifies a feature value corresponding to at least one specified data field in the unified digest data structure from the feature values of the public service data fields.

To further improve user experience in the service data query and tracing process, above-mentioned S206 of storing the service data digest information and the service data to be chained that are corresponding to each service processing node in the blockchain specifically includes the following:

Service processing timestamps, the service data digest information, and the service data to be chained are uploaded to the blockchain.

The service data digest information corresponding to each service processing node for the target service is associatively stored in descending order of the service processing timestamps.

Specifically, in a process of storing corresponding service data in the blockchain for each service processing node, the service data digest information is associatively stored in descending order of the service processing timestamps. As such, in the service data query and tracing process, service data digest information respectively corresponding to a plurality of service processing nodes included in the target service can be displayed for the user in reverse order.

Figure 6:
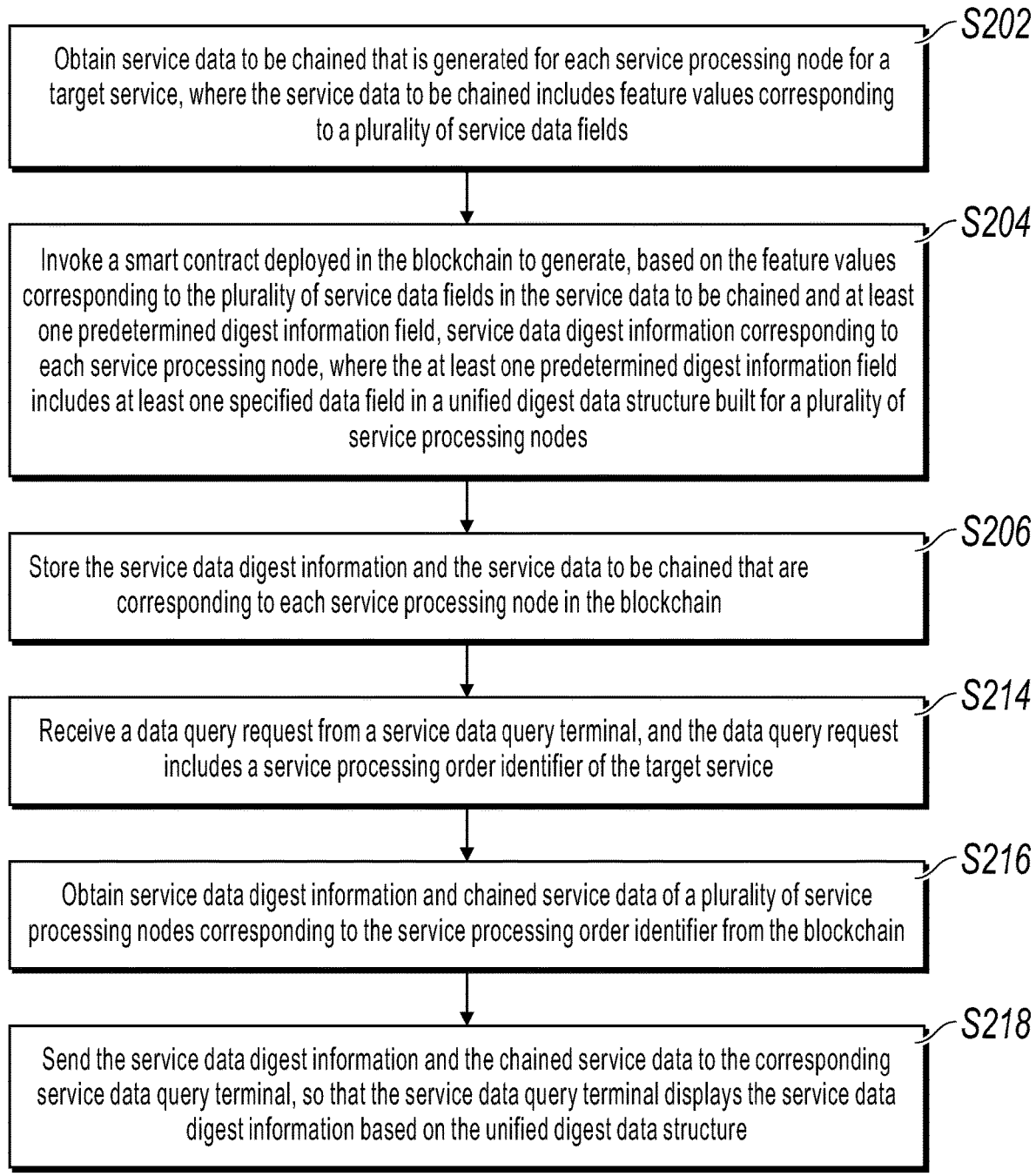
FIG. 6 is a fifth schematic flowchart illustrating a method for chaining service data, according to one or more embodiments of the present specification.

Further, for a service data query request from a user terminal, as shown in FIG. 6, after above-mentioned S206 of storing the service data digest information and the service data to be chained that are corresponding to each service processing node in the blockchain, the following is further included:

S214: Receive a data query request from a service data query terminal, and the data query request includes a service processing order identifier of the target service.

S216: Obtain service data digest information and chained service data of a plurality of service processing nodes corresponding to the service processing order identifier from the blockchain.

S218: Send the service data digest information and the chained service data to the corresponding service data query terminal, so that the service data query terminal displays the service data digest information based on the unified digest data structure.

Specifically, to further improve readability of service data so as to improve user experience, based on this, above-mentioned S218 of sending the service data digest information and the chained service data to the corresponding service data query terminal specifically includes the following:

The service data digest information of the plurality of service processing nodes corresponding to the service processing order identifier is sorted in descending order of service processing timestamps.

The sorted service data digest information and the corresponding chained service data are sent to the corresponding service data query terminal.

Figure 7A:
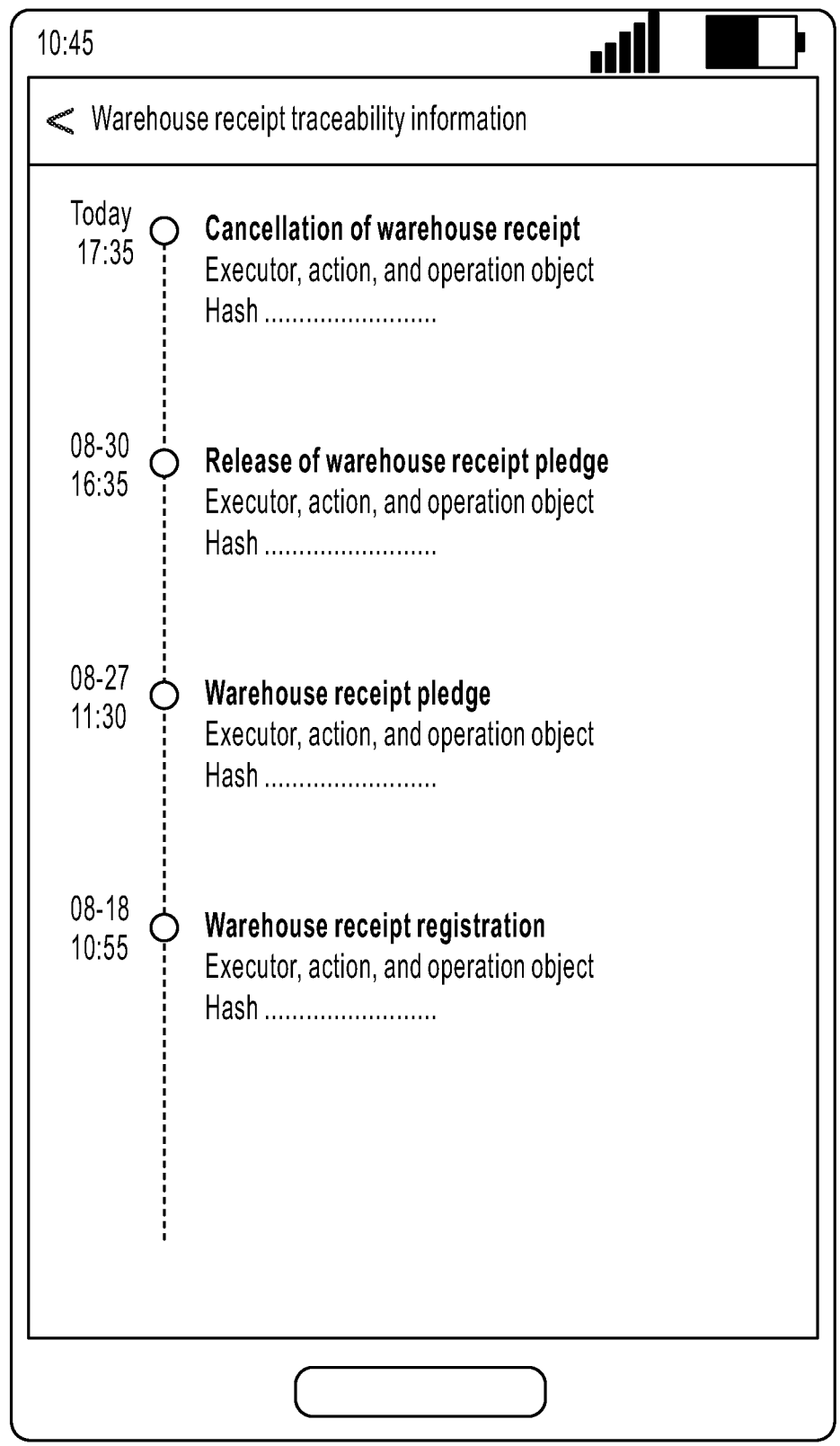
FIG. 7a is a schematic diagram 1 illustrating a display interface of service data digest information in a method for chaining service data, according to one or more embodiments of the present specification.

During specific implementation, that the target service is a digital property service business is still used as an example. Based on a trigger operation performed by a user on an application providing the digital property service business, a user terminal sends a service data query request of the target service to the service processing server, where the service data query request includes a service processing order identifier of the target service. The service processing server sends the service data query request to at least one blockchain node in the blockchain. After receiving the service data query request, the at least one blockchain node obtains service data digest information and chained service data of a plurality of service processing nodes corresponding to the service processing order identifier included in the service data query request from the blockchain. The at least one blockchain node sorts the obtained service data digest information of the plurality of service processing nodes in descending order of service processing timestamps, and sends the sorted service data digest information and the corresponding chained service data to the service processing server. The service processing server generates first target page data based on the sorted service data digest information and the chained service data, and sends the first target page data to a corresponding service data query terminal. The service data query terminal performs page rendering based on the received first target page data, to obtain a first target display page. As shown in FIG. 7*a*, warehouse receipt traceability information displayed on the first target display page includes key descriptions (such as executors, actions, and operation objects) of the service data digest information of the service processing nodes successively displayed in reverse order and key descriptions (such as hash values of the chained service data) of the chained service data. The service processing nodes can include warehouse receipt registration, warehouse receipt pledge, release of warehouse receipt pledge, and cancellation of warehouse receipt.

Figure 7B:
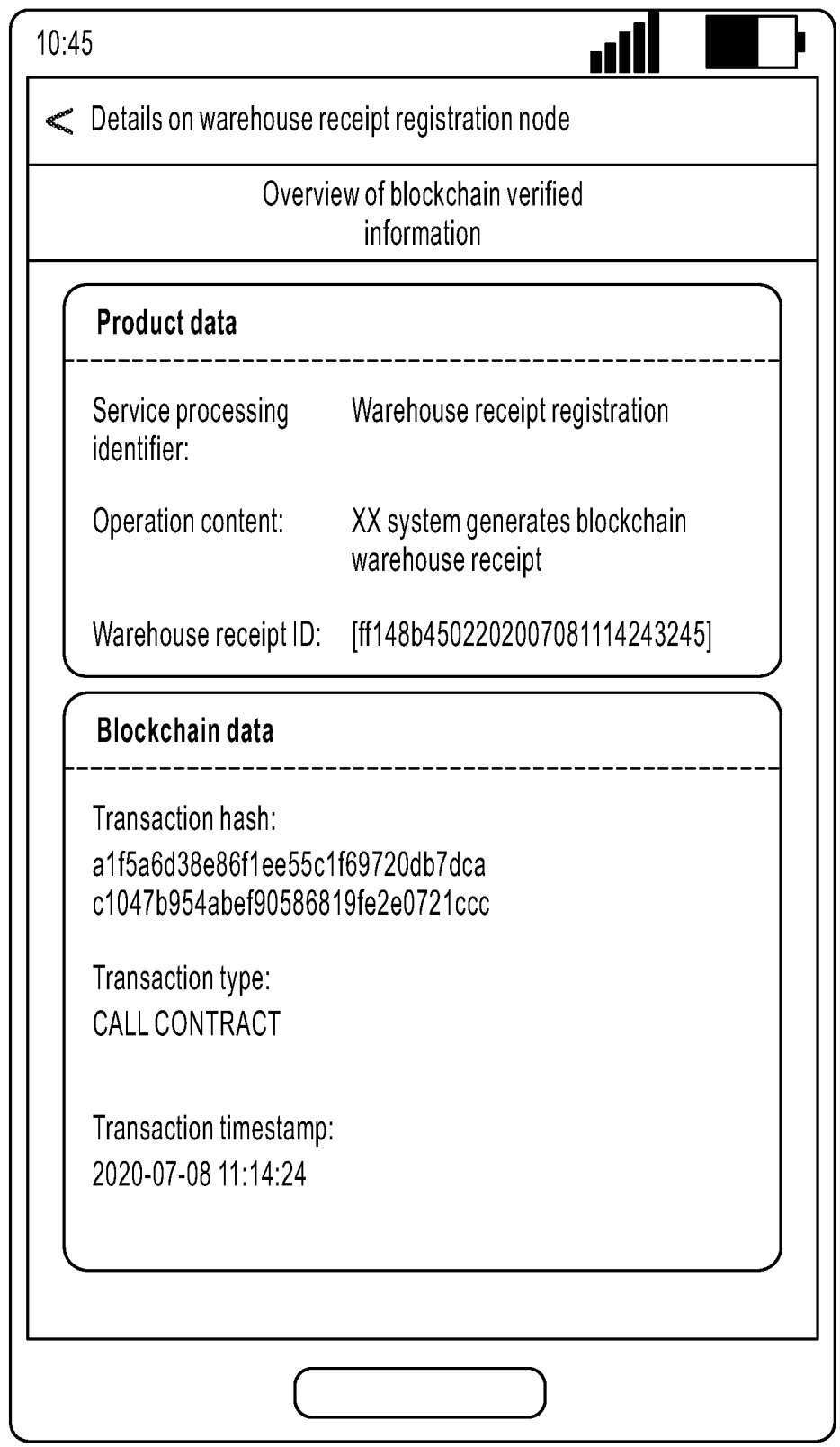
FIG. 7b is a schematic diagram 2 illustrating a display interface of service data digest information in a method for chaining service data, according to one or more embodiments of the present specification.

Further, based on a trigger operation performed by the user on the first target display page, the user terminal sends a details view request for a certain service processing node to the service processing server, where the details view request includes the service processing order identifier of the target service and a service processing node identifier. The service processing server obtains corresponding service data digest information and chained service data based on the service processing order identifier and the service processing node identifier, generates second target page data based on the service data digest information and the chained service data that are corresponding to the service processing node identifier, and sends the second target page data to the corresponding service data query terminal. The service data query terminal performs page rendering based on the received second target page data, to obtain a second target display page. That is, the second target display page is a secondary page of the first target display page. As shown in FIG. 7*b*, that the service processing node identifier that the user requests to view details on is warehouse receipt registration is used as an example. An overview of blockchain verified information displayed on the second target display page includes a product data part and a blockchain data part. A product data part of the warehouse receipt registration service node is service data digest information that is chained for the warehouse receipt registration node and displayed based on the unified digest data structure and that the user requests to view. For example, a service processing identifier is warehouse receipt registration, operation content corresponding to the warehouse receipt registration node is that a XX system generates a blockchain warehouse receipt, and a warehouse receipt ID is ff148b450220200708111 4243245. A blockchain data part of the warehouse receipt registration service node is chained service data that is chained for the warehouse receipt registration node and displayed based on the original blockchain storage data structure and that the user requests to view. For example, a transaction hash is a1f5a6d38e86f1ee55c1f69720db7 dcac1047b954abef90586819fe2e0721ccc, a transaction type is CALL CONTRACT, and a transaction timestamp is 2020-07-08 11:14:24.

According to the methods for chaining service data in the one or more embodiments of the present specification, by using the smart contract deployed in the blockchain in advance, corresponding service data digest information is generated for the service data to be chained that is generated for each service processing node in a process of executing the target service. The service data digest information is generated based on the unified digest data structure included in the smart contract. Then, the service data digest information corresponding to each service processing node is separately stored in the blockchain. As such, readability of service data stored in the blockchain can be implemented to facilitate a service data tracing service of any service processing node for the target service subsequently provided for a user, so that the user can quickly and clearly obtain a brief description of a processing procedure of any service processing node by using a client device.

Figure 8:
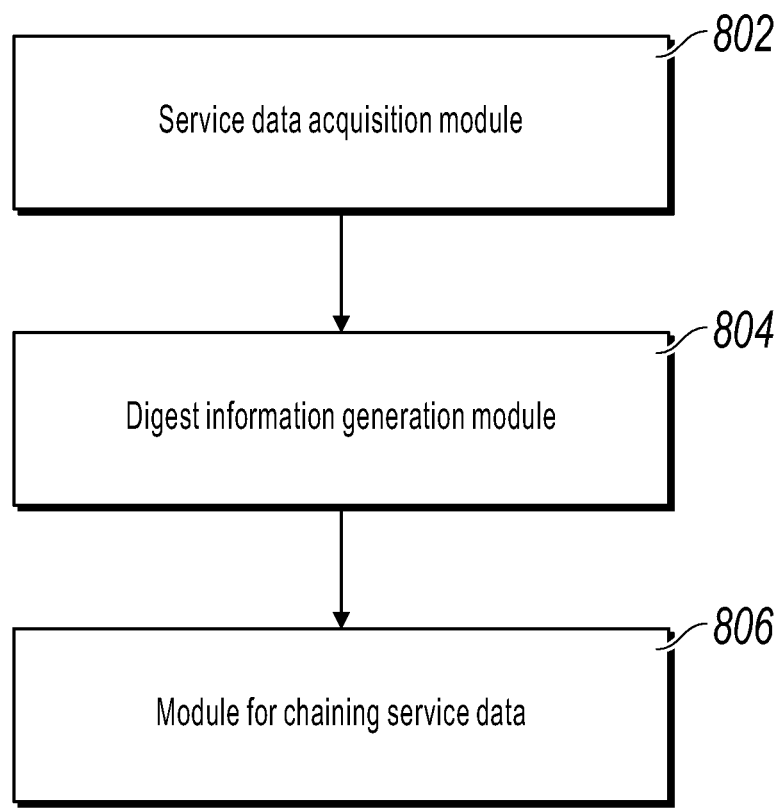
FIG. 8 is a schematic diagram illustrating module composition of an apparatus for chaining service data, according to one or more embodiments of the present specification.

Corresponding to the methods for chaining service data described in FIG. 2 to FIG. 7b, based on the same technical concept, one or more embodiments of the present specification further provide an apparatus for chaining service data. FIG. 8 is a schematic diagram illustrating module composition of an apparatus for chaining service data, according to one or more embodiments of the present specification. The apparatus is configured to perform the methods for chaining service data described in FIG. 2 to FIG. 7b. As shown in FIG. 8, the apparatus includes the following:

a service data acquisition module 802, configured to obtain service data to be chained that is generated for each service processing node for a target service, where the service data to be chained includes feature values corresponding to a plurality of service data fields;

a digest information generation module 804, configured to invoke a smart contract deployed in a blockchain to generate, based on the feature values corresponding to the plurality of service data fields and at least one predetermined digest information field, service data digest information corresponding to the service processing node, where the at least one predetermined digest information field includes at least one specified data field in a unified digest data structure built for a plurality of service processing nodes; and a module 806 for chaining service data, configured to store the service data digest information and the service data to be chained in the blockchain.

In the one or more embodiments of the present specification, by using the smart contract deployed in the blockchain in advance, corresponding service data digest information is generated for the service data to be chained that is generated for each service processing node in a process of executing the target service. The service data digest information is generated based on the unified digest data structure included in the smart contract. Then, the service data digest information corresponding to each service processing node is separately stored in the blockchain. As such, readability of service data stored in the blockchain can be implemented to facilitate a service data tracing service of any service processing node for the target service subsequently provided for a user, so that the user can quickly and clearly obtain a brief description of a processing procedure of any service processing node by using a client device.

Optionally, the digest information generation module 804 is configured to:
determine, from the feature values corresponding to the plurality of service data fields, a feature value corresponding to each target data field that matches the at least one predetermined digest information field; and
generate, based on the feature value of the target data field, the service data digest information corresponding to the service processing node.

Optionally, the digest information generation module 804 is configured to:
assign a value to each specified data field in the unified digest data structure based on the feature value of the target data field, to obtain a post-assignment unified digest data structure; and determine the post-assignment unified digest data structure as the service data digest information corresponding to the service processing node.

Optionally, the apparatus further includes a smart contract deployment module, configured to:
determine a combination of a service executor, a service processing action type, and a service operation object as a specified data field representing a service operation content description of the service processing node;
build a unified digest data structure based on a service processing identifier and the service operation content description; and
generate a smart contract that includes the unified digest data structure, and deploy the smart contract in the blockchain.

Optionally, the smart contract deployment module is configured to:
build the unified digest data structure based on additional service operation information, the service processing identifier, and the service operation content description.

Optionally, the smart contract deployment module is configured to:
determine a mapping relationship between a service processing node that the target service relates to and at least one additional information field that needs to be included in additional service operation information that is added for the service processing node; and
generate a smart contract that includes the unified digest data structure and the mapping relationship.

Optionally, the digest information generation module 804 is configured to:
determine, based on the mapping relationship, at least one additional information field that corresponds to the service processing node that generates the service data to be chained; and
determine, from the feature values corresponding to the plurality of service data fields, a feature value corresponding to each target data field that matches the at least one additional information field.

Optionally, the digest information generation module 804 is configured to:
determine public service data fields and private service data fields based on field annotation information that is used to represent data privacy attributes and that is corresponding to the service data fields; and
determine the feature value corresponding to each target data field that matches the at least one predetermined digest information field from feature values corresponding to the public service data fields.

Optionally, the module 806 for chaining service data is configured to:
upload service processing timestamps, the service data digest information, and the service data to be chained to the blockchain; and
associatively store the service data digest information corresponding to each service processing node for the target service in descending order of the service processing timestamps.

Optionally, the apparatus further includes a query request response module, configured to:
receive a data query request from a service data query terminal, and the data query request includes a service processing order identifier of the target service;
obtain service data digest information and chained service data of a plurality of service processing nodes corresponding to the service processing order identifier from the blockchain; and send the service data digest information and the chained service data to the service data query terminal, so that the service data query terminal displays the service data digest information based on the unified digest data structure.

Optionally, the query request response module is configured to:

sort the service data digest information of the plurality of service processing nodes corresponding to the service processing order identifier in descending order of service processing timestamps; and send the sorted service data digest information and the corresponding chained service data to the service data query terminal.

According to the apparatuses for chaining service data in the one or more embodiments of the present specification, by using the smart contract deployed in the blockchain in advance, corresponding service data digest information is generated for the service data to be chained that is generated for each service processing node in a process of executing the target service. The service data digest information is generated based on the unified digest data structure included in the smart contract. Then, the service data digest information corresponding to each service processing node is separately stored in the blockchain. As such, readability of service data stored in the blockchain can be implemented to facilitate a service data tracing service of any service processing node for the target service subsequently provided for a user, so that the user can quickly and clearly obtain a brief description of a processing procedure of any service processing node by using a client device.

It is worthwhile to note that the embodiments of the apparatuses for chaining service data in the present specification and the embodiments of the methods for chaining service data in the present specification are based on the same inventive concept. Therefore, for specific implementation of the embodiments, references can be made to the previously described implementation of the corresponding methods for chaining service data. Details are omitted here for simplicity.

Figure 9:
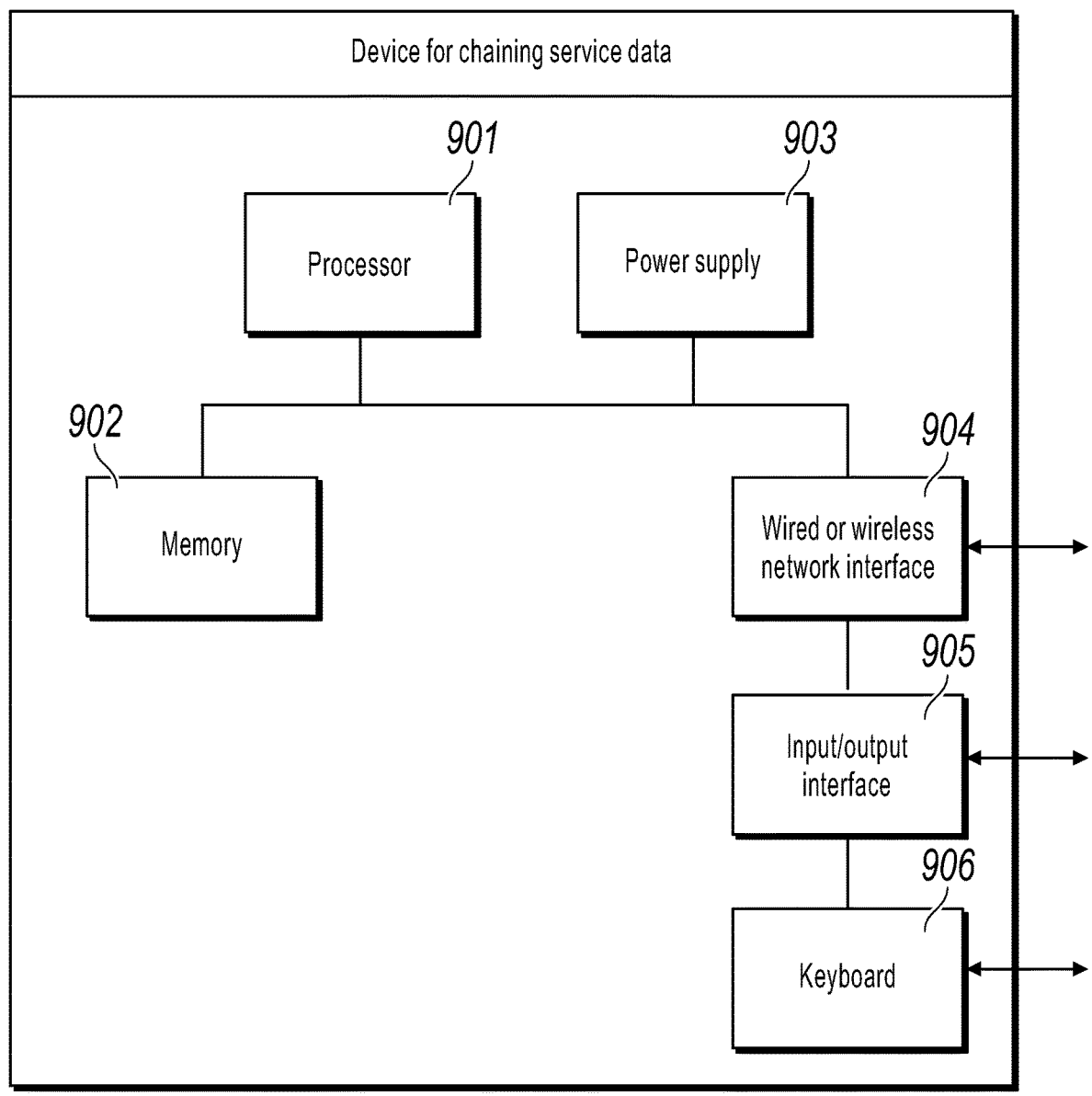
FIG. 9 is a schematic diagram illustrating a structure of a device for chaining service data, according to one or more embodiments of the present specification.

Further, corresponding to the methods shown in FIG. 2 to FIG. 7b, based on the same technical concept, one or more embodiments of the present specification further provide a device for chaining service data. The device is configured to perform the methods for chaining service data, as shown in FIG. 9.

The device for chaining service data varies greatly based on the configuration or performance. The device can include one or more processors 901 and one or more memories 902, and the memories 902 can store one or more applications or data. The memory 902 can be a transient memory or a persistent memory. The application stored in the memory 902 can include one or more modules (not shown in the figure), and each module can include a series of computer-executable instructions in the device for chaining service data. Further, the processor 901 can be configured to communicate with the memory 902, and execute a series of computer-executable instructions in the memory 902 in the device for chaining service data. The device for chaining service data can further include one or more power supplies 903, one or more wired or wireless network interfaces 904, one or more input/output interfaces 905, one or more keyboards 906, etc.

In a specific embodiment, the device for chaining service data includes a memory and one or more programs. The one or more programs are stored in the memory and can include one or more modules. Each module can include a series of computer-executable instructions in the device for chaining service data. One or more processors are configured to execute the one or more programs, including the following computer-executable instructions:

Service data to be chained that is generated for each service processing node for a target service is obtained, where the service data to be chained includes feature values corresponding to a plurality of service data fields.

A smart contract deployed in a blockchain is invoked to generate, based on the feature values corresponding to the plurality of service data fields and at least one predetermined digest information field, service data digest information corresponding to the service processing node, where the at least one predetermined digest information field includes at least one specified data field in a unified digest data structure built for a plurality of service processing nodes.

The service data digest information and the service data to be chained are stored in the blockchain.

Optionally, when the computer-executable instructions are executed, the generating, based on the feature values corresponding to the plurality of service data fields and at least one predetermined digest information field, service data digest information corresponding to the service processing node includes the following:

A feature value corresponding to each target data field that matches the at least one predetermined digest information field is determined from the feature values corresponding to the plurality of service data fields.

The service data digest information corresponding to the service processing node is generated based on the feature value of the target data field.

Optionally, when the computer-executable instructions are executed, the generating, based on the feature value of the target data field, the service data digest information corresponding to the service processing node includes the following:

A value is assigned to each specified data field in the unified digest data structure based on the feature value of the target data field, to obtain a post-assignment unified digest data structure.

The post-assignment unified digest data structure is determined as the service data digest information corresponding to the service processing node.

Optionally, when the computer-executable instructions are executed, before the obtaining service data to be chained that is generated for each service processing node for a target service, the following is further included:

A combination of a service executor, a service processing action type, and a service operation object is determined as a specified data field representing a service operation content description of the service processing node.

A unified digest data structure is built based on a service processing identifier and the service operation content description.

A smart contract that includes the unified digest data structure is generated, and the smart contract is deployed in the blockchain.

Optionally, when the computer-executable instructions are executed, the building a unified digest data structure based on a service processing identifier and the service operation content description includes the following:

The unified digest data structure is built based on additional service operation information, the service processing identifier, and the service operation content description.

Optionally, when the computer-executable instructions are executed, the generating a smart contract that includes the unified digest data structure includes the following:

A mapping relationship between a service processing node that the target service relates to and at least one additional information field that needs to be included in additional service operation information that is added for the service processing node is determined.

A smart contract that includes the unified digest data structure and the mapping relationship is generated.

Optionally, when the computer-executable instructions are executed, the determining, from the feature values corresponding to the plurality of service data fields, a feature value corresponding to each target data field that matches the at least one predetermined digest information field includes the following:

At least one additional information field that corresponds to the service processing node that generates the service data to be chained is determined based on the mapping relationship.

A feature value corresponding to each target data field that matches the at least one additional information field is determined from the feature values corresponding to the plurality of service data fields.

Optionally, when the computer-executable instructions are executed, the determining, from the feature values corresponding to the plurality of service data fields, a feature value corresponding to each target data field that matches the at least one predetermined digest information field includes the following:

Public service data fields and private service data fields are determined based on field annotation information that is used to represent data privacy attributes and that is corresponding to the service data fields.

The feature value corresponding to each target data field that matches the at least one predetermined digest information field is determined from feature values corresponding to the public service data fields.

Optionally, when the computer-executable instructions are executed, the storing the service data digest information and the service data to be chained in the blockchain includes the following:

Service processing timestamps, the service data digest information, and the service data to be chained are uploaded to the blockchain.

The service data digest information corresponding to each service processing node for the target service is associatively stored in descending order of the service processing timestamps.

Optionally, when the computer-executable instructions are executed, after the storing the service data digest information and the service data to be chained in the blockchain, the following is further included:

A data query request from a service data query terminal is received, and the data query request includes a service processing order identifier of the target service.

Service data digest information and chained service data of a plurality of service processing nodes corresponding to the service processing order identifier are obtained from the blockchain.

The service data digest information and the chained service data are sent to the service data query terminal, so that the service data query terminal displays the service data digest information based on the unified digest data structure.

Optionally, when the computer-executable instructions are executed, the sending the service data digest information and the chained service data to the service data query terminal includes the following:

The service data digest information of the plurality of service processing nodes corresponding to the service processing order identifier is sorted in descending order of service processing timestamps.

The sorted service data digest information and the corresponding chained service data are sent to the service data query terminal.

According to the devices for chaining service data in the one or more embodiments of the present specification, by using the smart contract deployed in the blockchain in advance, corresponding service data digest information is generated for the service data to be chained that is generated for each service processing node in a process of executing the target service. The service data digest information is generated based on the unified digest data structure included in the smart contract. Then, the service data digest information corresponding to each service processing node is separately stored in the blockchain. As such, readability of service data stored in the blockchain can be implemented to facilitate a service data tracing service of any service processing node for the target service subsequently provided for a user, so that the user can quickly and clearly obtain a brief description of a processing procedure of any service processing node by using a client device.

It is worthwhile to note that the embodiments of the devices for chaining service data in the present specification and the embodiments of the methods for chaining service data in the present specification are based on the same inventive concept. Therefore, for specific implementation of the embodiments, references can be made to the previously described implementation of the corresponding methods for chaining service data. Details are omitted here for simplicity.

Further, corresponding on the methods shown in FIG. 2 to FIG. 7b, based on the same technical concept, one or more embodiments of the present specification further provide a storage medium, configured to store computer-executable instructions. In a specific embodiment, the storage medium can be a universal serial bus (USB) flash drive, a compact disc, a hard disk, etc. When the computer-executable instructions stored in the storage medium are executed by a processor, the following procedure can be implemented:

Service data to be chained that is generated for each service processing node for a target service is obtained, where the service data to be chained includes feature values corresponding to a plurality of service data fields.

A smart contract deployed in a blockchain is invoked to generate, based on the feature values corresponding to the plurality of service data fields and at least one predetermined digest information field, service data digest information corresponding to the service processing node, where the at least one predetermined digest information field includes at least one specified data field in a unified digest data structure built for a plurality of service processing nodes.

The service data digest information and the service data to be chained are stored in the blockchain.

When the computer-executable instructions stored in the storage medium in the one or more embodiments of the present specification are executed by the processor, by using the smart contract deployed in the blockchain in advance, corresponding service data digest information is generated for the service data to be chained that is generated for each service processing node in a process of executing the target service. The service data digest information is generated based on the unified digest data structure included in the smart contract. Then, the service data digest information corresponding to each service processing node is separately stored in the blockchain. As such, readability of service data stored in the blockchain can be implemented to facilitate a service data tracing service of any service processing node for the target service subsequently provided for a user, so that the user can quickly and clearly obtain a brief description of a processing procedure of any service processing node by using a client device.

It is worthwhile to note that the embodiments of the storage media in the present specification and the embodiments of the methods for chaining service data in the present specification are based on the same inventive concept. Therefore, for specific implementation of the embodiments, references can be made to the previously described implementation of the corresponding methods for chaining service data. Details are omitted here for simplicity.

Specific embodiments of the present specification are described above. Other embodiments fall within the scope of the appended claims. In some situations, the actions or steps described in the claims can be performed in an order different from the order in the embodiments and the desired results can still be achieved. In addition, the process depicted in the accompanying drawings does not necessarily need a particular execution order to achieve the desired results. In some implementations, multi-tasking and concurrent processing is feasible or can be advantageous.

In the 1990s, whether a technical improvement is a hardware improvement (for example, an improvement to a circuit structure, such as a diode, a transistor, or a switch) or a software improvement (an improvement to a method procedure) can be clearly distinguished. However, as technologies develop, current improvements to many method procedures can be considered as direct improvements to hardware circuit structures. A designer usually programs an improved method procedure into a hardware circuit, to obtain a corresponding hardware circuit structure. Therefore, a method procedure can be improved by using a hardware entity module. For example, a programmable logic device (PLD) (for example, a field programmable gate array (FPGA)) is such an integrated circuit, and a logical function of the PLD is determined by a user through device programming. The designer performs programming to "integrate" a digital system to a PLD without requesting a chip manufacturer to design and produce an application-specific integrated circuit chip. In addition, at present, instead of manually manufacturing an integrated circuit chip, this type of programming is mostly implemented by using "logic compiler" software. The programming is similar to a software compiler used to develop and write a program. Original code needs to be written in a particular programming language for compilation. The language is referred to as a hardware description language (HDL). There are many HDLs, such as the Advanced Boolean Expression Language (ABEL), the Altera Hardware Description Language (AHDL), Confluence, the Cornell University Programming Language (CUPL), HDCal, the Java Hardware Description Language (JHDL), Lava, Lola, MyHDL, PALASM, and the Ruby Hardware Description Language (RHDL). At present, the very-high-speed integrated circuit hardware description language (VHDL) and Verilog2 are most commonly used. A person skilled in the art should also understand that a hardware circuit that implements a logical method procedure can be readily obtained once the method procedure is logically programmed by using the several described hardware description languages and is programmed into an integrated circuit.

A controller can be implemented by using any appropriate method. For example, the controller can be a microprocessor or a processor, or a computer-readable medium that stores computer readable program code (such as software or firmware) that can be executed by the microprocessor or the processor, a logic gate, a switch, an application-specific integrated circuit (ASIC), a programmable logic controller, or a built-in microprocessor. Examples of the controller include but are not limited to the following microprocessors: ARC 625D, Atmel AT91SAM, Microchip PIC18F26K20, and Silicone Labs C8051F320. The memory controller can also be implemented as a part of the control logic of the memory. A person skilled in the art also knows that, in addition to implementing the controller by only using the computer readable program code, logic programming can be performed on method steps to allow the controller to implement the same function in forms of the logic gate, the switch, the application-specific integrated circuit, the programmable logic controller, and the built-in microcontroller. Therefore, the controller can be considered as a hardware component, and an apparatus configured to implement various functions in the controller can also be considered as a structure in the hardware component. The apparatus configured to implement various functions can even be considered as both a software module implementing the method and a structure in the hardware component.

The system, apparatus, module, or unit described in the previously described embodiments can be implemented specifically by a computer chip or an entity, or implemented by a product having a certain function. A typical implementation device is a computer. Specifically, the computer can be, for example, a personal computer, a laptop computer, a cellular phone, a camera phone, a smartphone, a personal digital assistant, a media player, a navigation device, an email device, a game console, a tablet computer, a wearable device, or any combination of these devices.

For ease of description, the apparatus above is described by dividing functions into various units. Certainly, when the present specification is implemented, a function of each unit can be implemented in one or more pieces of software and/or hardware.

A person skilled in the art should understand that one or more embodiments of the present specification can be provided as a method, a system, or a computer program product. Therefore, the one or more embodiments of the present specification can use a form of hardware only embodiments, software only embodiments, or embodiments with a combination of software and hardware. Moreover, the one or more embodiments of the present specification can use a form of a computer program product that is implemented on one or more computer-usable storage media (including but not limited to a disk memory, a CD-ROM, an optical memory, etc.) that include computer-usable program code.

The present specification is described with reference to the flowcharts and/or block diagrams of the methods, the devices (systems), and the computer program products based on one or more embodiments of the present specification. It should be understood that computer program instructions can be used to implement each process and/or each block in the flowcharts and/or the block diagrams and a combination of a process and/or a block in the flowcharts and/or the block diagrams. These computer program instructions can be provided for a general-purpose computer, a dedicated computer, an embedded processor, or a processor of another programmable data processing device to generate a machine, so that the instructions executed by the computer or the processor of the another programmable data processing device generate a device for implementing a specific function in one or more processes in the flowcharts and/or in one or more blocks in the block diagrams.

These computer program instructions can be stored in a computer readable memory that can instruct the computer or the another programmable data processing device to work in a specific way, so that the instructions stored in the computer readable memory generate an artifact that includes an instruction apparatus. The instruction apparatus implements a specific function in one or more processes in the flowcharts and/or in one or more blocks in the block diagrams.

These computer program instructions can be loaded onto the computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

In a typical configuration, the computing device includes one or more processors (CPU), one or more input/output interfaces, one or more network interfaces, and one or more memories.

The memory may include a form of a volatile memory, a random access memory (RAM) and/or a non-volatile memory, etc. in a computer readable medium, such as a read-only memory (ROM) or a flash memory (flash RAM). The memory is an example of the computer readable medium.

The computer readable medium includes transitory and non-transitory, removable and non-removable media, and can store information by using any method or technology. The information can be a computer readable instruction, a data structure, a program module, or other data. Examples of the computer storage medium include but are not limited to a phase change random access memory (PRAM), a static RAM (SRAM), a dynamic RAM (DRAM), a RAM of another type, a read-only memory (ROM), an electrically erasable programmable ROM (EEPROM), a flash memory or another memory technology, a compact disc ROM (CD-ROM), a digital versatile disc (DVD), or another optical storage, a cassette, a cassette magnetic disk storage, or another magnetic storage device or any other non-transmission medium. The computer storage medium can be configured to store information that can be accessed by the computing device. Based on the definition in the present specification, the computer readable medium does not include a transitory computer readable medium (transitory media), for example, a modulated data signal and carrier.

It is worthwhile to further note that, the terms "include", "contain", or their any other variants are intended to cover a non-exclusive inclusion, so that a process, a method, a product, or a device that includes a list of elements not only includes those elements but also includes other elements which are not expressly listed, or further includes elements inherent to such process, method, product, or device. Without more constraints, an element preceded by "includes a . . . " does not preclude the existence of additional identical elements in the process, method, product, or device that includes the element.

A person skilled in the art should understand that one or more embodiments of the present specification can be provided as a method, a system, or a computer program product. Therefore, the one or more embodiments of the present specification can use a form of hardware only embodiments, software only embodiments, or embodiments with a combination of software and hardware. Moreover, the one or more embodiments of the present specification can use a form of a computer program product that is implemented on one or more computer-usable storage media (including but not limited to a disk memory, a CD-ROM, an optical memory, etc.) that include computer-usable program code.

The present specification can be described in the general context of computer-executable instructions, for example, a program module. Generally, the program module includes a routine, a program, an object, a component, a data structure, etc. executing a specific task or implementing a specific abstract data type. The present specification can alternatively be practiced in distributed computing environments in which tasks are performed by remote processing devices that are connected through a communications network. In a distributed computing environment, the program module can be located in both local and remote computer storage media including storage devices.

The embodiments in the present specification are described in a progressive way. For same or similar parts of the embodiments, references can be made to the embodiments mutually. Each embodiment focuses on a difference from other embodiments. Particularly, for a system embodiment, the system embodiment is similar to a method embodiment, and therefore is described briefly. For related parts, references can be made to related descriptions in the method embodiment.

The previous descriptions are merely one or more embodiments of the present specification, and are not intended to limit the present specification. A person skilled in the art can make various modifications and changes to the present specification. Any modification, equivalent replacement, or improvement made without departing from the spirits and principles of the present specification shall fall within the scope of one or more claims in the present specification.

What is claimed is:

1. A computer-implemented method for chaining service data, comprising:
obtaining service data to be chained that is generated by a service processing node for a target service, wherein the service data to be chained comprises feature values corresponding to a plurality of service data fields;
invoking a smart contract that was previously deployed in a blockchain;
generating, by the smart contract, service data digest information corresponding to the service processing node based on the feature values and at least one predetermined digest information field, the at least one predetermined digest information field comprising at least one specified data field in a unified digest data structure built for a plurality of service processing nodes, wherein the service data digest information is separate from the service data;
storing the service data digest information and the service data in the blockchain by:
uploading service processing timestamps, the service data digest information, and the service data to the blockchain; and
associatively storing the service data digest information corresponding to the service processing node for the target service in descending order of the service processing timestamps;
receiving a data query request from a service data query terminal, the data query request comprising a service processing order identifier of the target service;
obtaining the service data digest information and stored service data of the plurality of service processing nodes corresponding to the service processing order identifier from the blockchain; and sending the service data digest information and the stored service data to the service data query terminal, so that the service data query terminal displays the service data digest information based on the unified digest data structure.

2. The method of claim 1, wherein generating, based on the feature values corresponding to the plurality of service data fields and the at least one predetermined digest information field, the service data digest information corresponding to the service processing node comprises the following:
determining, from the feature values corresponding to the plurality of service data fields, a feature value corresponding to each target data field of a plurality of target data fields that matches the at least one predetermined digest information field; and
generating, based on each feature value corresponding to each target data field, the service data digest information corresponding to the service processing node.

3. The method of claim 2, wherein the generating, based on each feature value of each target data field, the service data digest information corresponding to the service processing node comprises the following:
assigning a value to the at least one specified data field in the unified digest data structure based on the feature value of the target data field, to obtain a post-assignment unified digest data structure; and
determining the post-assignment unified digest data structure as the service data digest information corresponding to the service processing node.

4. The method of claim 2, wherein before obtaining the service data to be chained that is generated for the service processing node for the target service the method comprises:
determining a combination of a service executor, a service processing action type, and a service operation object as a particular specified data field representing a service operation content description of the service processing node;
building the unified digest data structure based on a service processing identifier and the service operation content description; and
generating the smart contract that comprises the unified digest data structure, and deploying the smart contract in the blockchain.

5. The method of claim 4, wherein the building the unified digest data structure based on the service processing identifier and the service operation content description comprises the following:
building the unified digest data structure based on additional service operation information, the service processing identifier, and the service operation content description.

6. The method of claim 5, wherein the generating the smart contract that comprises the unified digest data structure comprises the following:
determining a mapping relationship between the service processing node that the target service relates to and at least one additional information field that needs to be comprised in additional service operation information that is added for the service processing node; and
generating the smart contract that comprises the unified digest data structure and the mapping relationship.

7. The method of claim 6, wherein the determining, from the feature values corresponding to the plurality of service data fields, a feature value corresponding to each target data field that matches the at least one predetermined digest information field comprises the following:
determining, based on the mapping relationship, at least one particular additional information field that corresponds to the service processing node that generates the service data to be chained; and
determining, from the feature values corresponding to the plurality of service data fields, a feature value corresponding to each target data field that matches the at least one additional information field.

8. The method of claim 2, wherein the determining, from the feature values corresponding to the plurality of service data fields, the feature value corresponding to each target data field that matches the at least one predetermined digest information field comprises the following:
determining public service data fields and private service data fields based on field annotation information that is used to represent data privacy attributes and that is corresponding to the service data fields; and
determining the feature value corresponding to each target data field that matches the at least one predetermined digest information field from feature values corresponding to the public service data fields.

9. The method of claim 1, wherein the sending the service data digest information and the service data to the service data query terminal comprises the following:
sorting the service data digest information of the plurality of service processing nodes corresponding to the service processing order identifier in descending order of service processing timestamps; and
sending the sorted service data digest information and the chained service data to the service data query terminal.

10. A non-transitory, computer-readable medium storing one or more instructions executable by a computer system to perform operations comprising:
obtaining service data to be chained that is generated by a service processing node for a target service, wherein the service data to be chained comprises feature values corresponding to a plurality of service data fields;
invoking a smart contract that was previously deployed in a blockchain;
generating, by the smart contract, service data digest information corresponding to the service processing node based on the feature values and at least one predetermined digest information field, the at least one predetermined digest information field comprising at least one specified data field in a unified digest data structure built for a plurality of service processing nodes, wherein the service data digest information is separate from the service data;
storing the service data digest information and the service data in the blockchain by:
uploading service processing timestamps, the service data digest information, and the service data to the blockchain; and
associatively storing the service data digest information corresponding to the service processing node for the target service in descending order of the service processing timestamps;
receiving a data query request from a service data query terminal, the data query request comprising a service processing order identifier of the target service;
obtaining the service data digest information and stored service data of the plurality of service processing nodes corresponding to the service processing order identifier from the blockchain; and
sending the service data digest information and the stored service data to the service data query terminal, so that the service data query terminal displays the service data digest information based on the unified digest data structure.

11. The computer-readable medium of claim 10, wherein generating, based on the feature values corresponding to the plurality of service data fields and the at least one predetermined digest information field, the service data digest information corresponding to the service processing node comprises the following:
determining, from the feature values corresponding to the plurality of service data fields, a feature value corresponding to each target data field of a plurality of target data fields that matches the at least one predetermined digest information field; and
generating, based on each feature value corresponding to each target data field, the service data digest information corresponding to the service processing node.

12. The computer-readable medium of claim 11, wherein the generating, based on each feature value of each target data field, the service data digest information corresponding to the service processing node comprises the following:
assigning a value to the at least one specified data field in the unified digest data structure based on the feature value of the target data field, to obtain a post-assignment unified digest data structure; and
determining the post-assignment unified digest data structure as the service data digest information corresponding to the service processing node.

13. The computer-readable medium of claim 11, comprising before obtaining the service data to be chained that is generated for the service processing node for the target service:
determining a combination of a service executor, a service processing action type, and a service operation object as a particular specified data field representing a service operation content description of the service processing node;
building the unified digest data structure based on a service processing identifier and the service operation content description; and
generating the smart contract that comprises the unified digest data structure, and deploying the smart contract in the blockchain.

14. The computer-readable medium of claim 13, wherein the building the unified digest data structure based on the service processing identifier and the service operation content description comprises the following:
building the unified digest data structure based on additional service operation information, the service processing identifier, and the service operation content description.

15. A computer-implemented system, comprising:
one or more computers; and
one or more computer memory devices interoperably coupled with the one or more computers and having tangible, non-transitory, machine-readable media storing one or more instructions that, when executed by the one or more computers, perform one or more operations comprising:
obtaining service data to be chained that is generated by a service processing node for a target service, wherein the service data to be chained comprises feature values corresponding to a plurality of service data fields;
invoking a smart contract that was previously deployed in a blockchain;
generating, by the smart contract, service data digest information corresponding to the service processing node based on the feature values and at least one predetermined digest information field, the at least one predetermined digest information field comprising at least one specified data field in a unified digest data structure built for a plurality of service processing nodes, wherein the service data digest information is separate from the service data;
storing the service data digest information and the service data to be chained in the blockchain by:
uploading service processing timestamps, the service data digest information, and the service data to the blockchain; and
associatively storing the service data digest information corresponding to the service processing node for the target service in descending order of the service processing timestamps;
receiving a data query request from a service data query terminal, the data query request comprising a service processing order identifier of the target service;
obtaining the service data digest information and stored service data of the plurality of service processing nodes corresponding to the service processing order identifier from the blockchain; and
sending the service data digest information and the stored service data to the service data query terminal, so that the service data query terminal displays the service data digest information based on the unified digest data structure.

16. The system of claim 15, wherein generating, based on the feature values corresponding to the plurality of service data fields and the at least one predetermined digest information field, the service data digest information corresponding to the service processing node comprises the following:
determining, from the feature values corresponding to the plurality of service data fields, a feature value corresponding to each target data field of a plurality of target data fields that matches the at least one predetermined digest information field; and
generating, based on each feature value corresponding to each target data field, the service data digest information corresponding to the service processing node.

17. The system of claim 16, wherein the generating, based on each feature value of each target data field, the service data digest information corresponding to the service processing node comprises the following:
assigning a value to the at least one specified data field in the unified digest data structure based on the feature value of the target data field, to obtain a post-assignment unified digest data structure; and
determining the post-assignment unified digest data structure as the service data digest information corresponding to the service processing node.

18. The system of claim 16, the operations comprising, before obtaining the service data to be chained that is generated for the service processing node for the target service:
determining a combination of a service executor, a service processing action type, and a service operation object as a particular specified data field representing a service operation content description of the service processing node;
building the unified digest data structure based on a service processing identifier and the service operation content description; and generating the smart contract that comprises the unified digest data structure, and deploying the smart contract in the blockchain.

\* \* \* \* \*

UNITED STATES PATENT AND TRADEMARK OFFICE
CERTIFICATE OF CORRECTION

PATENT NO. : 11,366,925 B2
APPLICATION NO. : 17/362904
DATED : June 21, 2022
INVENTOR(S) : Erfeng Yan It is certified that error appears in the above-identified patent and that said Letters Patent is hereby corrected as shown below:

In the Claims

In Column 26, Line 11, Claim 15, delete "data to be chained in" and insert -- data in --, therefor.

Signed and Sealed this
Ninth Day of August, 2022

Katherine Kelly Vidal
Director of the United States Patent and Trademark Office